US008774313B2

(12) United States Patent
Dou et al.

(10) Patent No.: US 8,774,313 B2
(45) Date of Patent: Jul. 8, 2014

(54) NONLINEAR COMPENSATING APPARATUS AND TRANSMITTER

(75) Inventors: Liang Dou, Beijing (CN); Zhenning Tao, Beijing (CN)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 13/212,543

(22) Filed: Aug. 18, 2011

(65) Prior Publication Data

US 2012/0076235 A1 Mar. 29, 2012

(30) Foreign Application Priority Data

Sep. 28, 2010 (CN) .......................... 2010 1 0505260

(51) Int. Cl.
 *H04L 25/03* (2006.01)
(52) U.S. Cl.
 USPC .......................................................... 375/296
(58) Field of Classification Search
 USPC ............ 375/242, 254, 260, 295, 296; 398/28, 398/38, 158, 188, 192, 208; 702/86
 See application file for complete search history.

(56) References Cited

U.S. PATENT DOCUMENTS

| 2005/0163250 A1* | 7/2005 | McCallister ................... 375/296 |
| 2007/0036238 A1* | 2/2007 | Matero et al. ................. 375/296 |
| 2009/0225899 A1* | 9/2009 | Dent ............................. 375/296 |

FOREIGN PATENT DOCUMENTS

CN 1795627 6/2006

OTHER PUBLICATIONS

Antonio Mecozzi et al., Anaylsis of Intrachannel Nonlinear Effects in Highly Dispersed Optical Pulse Transmission, IEEE Photonics Technology Letters, vol. 12, No. 4, Apr. 2000, pp. 392-394.

G. Raybon et al., Compensation of Intra-Channel Nonlinearities in 40 Gb/s Psuedo-Linear Systems Using Optical Phase Conjugation, PDP32, 3pages.
Ezra Ip et al., "Compensation of Dispersion and Nonlinear Impairments Using Digital Backpropagation", Journal of Lightwave Technology, vol. 26, No. 20, Oct. 15, 2008, pp. 3416-3425.
F. Yaman, et al., Nonlinear Impairment Compensation for Polarization-Division Multiplexed WDM Transmission Using Digital Backward Propagation, IEEE Photonics Journal, IEEE Photonics Society Publication, vol. 1,, No. 2, Aug. 2009, pp. 144-152.
Chunmin Xia et al., "Mitigation of Optical Intrachannel Nonlinearity Using Nonlinear Electrical Equalization", 2 pages.

(Continued)

*Primary Examiner* — Sam K Ahn
*Assistant Examiner* — Shawkat M Ali
(74) *Attorney, Agent, or Firm* — Staas & Halsey LLP (57) ABSTRACT

The present invention provides nonlinear compensating apparatus and transmitter. The nonlinear compensating apparatus comprises: an information acquiring unit to acquire a symbol information sequence of the pulse information input by a transmitting side; a perturbation quantity calculating unit to calculate the weighted sum of the interaction of the pulses of several items at several different instants relative to the current instant, to obtain the perturbation quantity produced by the current instant nonlinear effect on a transmission link of a certain length; and an information compensating unit to compensate for the symbol information sequence of the pulses at the current instant acquired by the information acquiring unit by using the perturbation quantity obtained by the perturbation quantity calculating unit, so as to obtain the symbol information sequence compensated at the current instant to cause the transmitting side to transmit signals according to the compensated symbol information sequence. The apparatus corrects the symbol information sequence of the pulse signals input by a transmitting side, with the complexity of calculation being low, and the apparatus is applicable to single-polarization and dual-polarization multiplexing systems, and at the same time, compatible with any modulation format.

10 Claims, 5 Drawing Sheets

(56) References Cited

OTHER PUBLICATIONS

Yan Gao et al., Experimental Demonstration of Nonlinear Electrical Equalizer to Mitigate Intra-channel Nonlinearitites in Coherent QPSK Systems, ECOC 2009, Sep. 20-24, Vienna, Austria, 2 pages.

Kim Roberts et al, Electronic Precompensation of Optical Nonlinearity, IEEE Photonics Technology Letters, vol. 18, No. 2, Jan. 15, 2006, pp. 403-405.

Vladimir Pechenkin et al., Constrained Coding for Quasi-Linear Optical Data Transmission Systems, Journal of LIghtwave Technology, vol. 24, No. 12, Dec. 2009, pp. 4895-4902.

Hussam G. Batshon et al., An Improved Technique for Suppression of Intrachannel Four-Wave Mixing in 40 Gb/s Optical Transmission Systems, IEEE Photonics Technology Letters, vol. 19, No. 3, Jan. 15, 2007, pp. 67-69.

Xiao Xiaosheng, "Suppression of the Nonlinear Kerr Effect in Optical Fiber Communication Systems by Dispersion Management and Optical Phase Conigation", Nov. 2006, pp. 1-113.

Chinese Office Action mailed Dec. 4, 2013 in corresponding Chinese Application No. 201010505260.6.

* cited by examiner

NONLINEAR COMPENSATING APPARATUS AND TRANSMITTER

CROSS REFERENCE TO RELATED APPLICATIONS

This application claims the benefit of Chinese Application No. 201010505260.6, filed Sep. 28, 2010, the disclosure of which is incorporated herein by reference.

TECHNICAL FIELD

The present invention relates to the field of optical communications and in particular, to nonlinear compensating apparatus and transmitter in a channel.

BACKGROUND OF THE INVENTION

Nonlinearity in a channel is an inherent damage in an optical transmission system and is resulted from the Kerr Effect of the optical fiber. The effect of nonlinearity in the channel on the system includes: timing jitter, signal amplitude fluctuation and generation of ghost pulse, etc. [1].

When the rate of a single channel reaches 40-60 Gbits/s or higher, due to the effect of the dispersion, the pulses within the same channel will be greatly widened and overlap each other, with an energy exchange occurring between the overlapped pulses under the effect of the nonlinearity. In such a case, even though the remaining dispersion within the link is compensated at the receiving side, the system will still be subjected to severe nonlinear damage. And along with the increase in the capacity of the optical fiber transmission system, simple intensity modulation formats will be gradually replaced by more complex multidimensional modulation technologies. A higher incident power is often required in order to ensure that a complex modulation format has a sufficient signal to noise ratio, resulting in the increase in the nonlinear penalty of the system.

Currently, for a long-haul optical communication system, such schemes as link design, digital signal processing (DSP) of a receiver and encoding of transmitted signal, etc. are adopted to compensate or weaken the effect of the nonlinearity in the channel on the system. Following is a brief description of these schemes.

1) Scheme of Link Design:

The nonlinearity in the channel is weakened by adding an optical phase conjugate unit in the link, and in this way, the transmission haul may be increased to 6400 km from 5200 km [2].

2) Scheme of digital signal processing of a receiver, including a processing based on the channel inversion and a processing based on a nonlinear electrical filter, and wherein, the processing based on the channel inversion: using the coherent receiver to obtain the electrical field signal containing an amplitude and phase of the signal light after being transmitted via a link, and constructing a virtual link completely opposite to the link parameters (dispersion coefficient, nonlinear coefficient and attenuation coefficient) according to the link configuration; and then passing the received electrical field signal through the virtual link, thereby compensating the damage of nonlinearity of the signal;

the processing based on a nonlinear electrical filter [5]: using a nonlinear electrical filter to equalize the signal being deteriorated by the nonlinearity.

3) Scheme of pre-compensating or encoding the transmitted signal at a transmitter side, comprising a pre-compensating scheme based on the channel inversion [7], a encoding scheme [8] and a new modulation scheme, wherein Pre-compensating scheme based on the channel inversion [7]: firstly obtaining through calculation a signal of a transmission sequence with a certain length (a combination of various bits) after passing through a virtual link, and then transmitting a corresponding pre-compensating waveform according to the information sequence through a lookup table;

Encoding scheme [8]: reducing the times of occurrence of the worst bit sequence under the effect of the nonlinearity within the channel by increasing redundancy;

New modulation scheme [9]: as to the OOK amplitude modulation signal, reducing effectively the effect of the four-wave mixing within the channel according to the phase of each of the symbols of the bit sequence.

However, it is found by the applicant in the implementation of the present invention that following defects exist in the above prior art:

1) the scheme of link design is not applicable to a laid optical fiber link and at the same time, there is no mature commercial module corresponding to the optical phase conjugate technology;

2) if the receiver adopts the scheme based on the channel inversion, it needs to solve the nonlinear Schrodinger equation by generally using a steply Fourier algorithm, and the system complexity depends on the size of the step to a certain extent; when the step is less than ⅓ of the span of the optical fiber, the performance of the compensation is optimal and thus, the complexity of calculation is excessively high, and even though the step is equal to the length of the span of the optical fiber, the number of multiplication needed in such scheme is more than 100 times greater than the linear filters needed to compensate the dispersion in the compensating link, which is a great challenge to the existing DSP technology [3][4];

3) the scheme in which the receiver side is based on nonlinear filters: in comparison with the scheme based on the channel inversion, the calculation complexity of this scheme is not reduced and even higher; and at the same time, since the processed signal is the signal after distortion (nonlinearity, frequency difference, and laser linewidth), it is somewhat difficult in algorithm convergence;

4) the pre-compensating scheme in which the transmitter side is based on the channel inversion: when the memory length of the system is relatively large, such as in a wireless dispersion compensating system, the number of the interactive symbols will reach 100 orders, and at this time, the size of the lookup table is $2^{100}$ or $4^{100}$ (dependent on the modulation scheme), which is hard to be realized;

5) the scheme of encoding at the transmitter side: the information rate is compromised.

Some documentations advantageous to the understanding of the present invention and the prior art are listed below, which are incorporated herein by reference, as they are stated fully in this text.

[1] IEEE PTL Vol. 12, No. 4, 2000, Antonio Mecozzi et. al.;
[2] OFC2004, PDP32, Chowdhury;
[3] Journal of Lightwave Technology, 2008, Kahn et. al.;
[4] IEEE Photonics Journal Volume 1, Number 2, August 2009; F. Yaman et. al.;
[5] JOURNAL OF LIGHTWAVE TECHNOLOGY, VOL. 25, NO. 4, APRIL 2007, Chunmin Xia;
[6] ECOC, 2009, Yan Gao;
[7] IEEE Photonics Technology Lett., Vol. 18, 2006, pp. 403-405, K. Roberts et. al.;

[8] Journal Of Lightwave Technology, 2006, Vladimir Pechenkin et. al.;

[9] IEEE Photonics Technology Letters 2007, Ivan B. Djordjevic;

[10] Electrical domain compensation of non-linear effects in an optical communications system, CN1795627A, published on Jun. 28, 2006;

[11] Suppression of the Nonlinear Kerr Effect in Optical Fiber Communication Systems by Dispersion Management and Optical Phase Conjugation, a doctorial dissertation of Tsinghua University, November, 2006.

SUMMARY OF THE INVENTION

The object of the embodiments of the present invention is to provide nonlinear compensating apparatus and a transmitter, compensating the original symbol information sequence at the transmitting side by using the vector perturbation generated by the nonlinearity effect in the transmission link, thereby obtaining a desired undamaged signal at the receiving side with low complexity calculation, which are applicable to single-polarization and dual-polarization multiplex systems and at the same time, compatible with any format of modulation.

According to one aspect of the embodiments of the present invention, there is provided nonlinear compensating apparatus, comprising:

an information acquiring unit to acquire a symbol information sequence of the pulse information input by a transmitting side;

a perturbation quantity calculating unit to calculate the weighted sum of the interactions of the pulses on several different instants of several items relative to the current instant, to obtain the perturbation quantity produced by the current instant nonlinear effect on a transmission link of a certain length; and an information compensating unit to calculate the difference between the symbol information sequence acquired by the information acquiring unit and the perturbation quantity obtained by the perturbation quantity calculating unit, so as to obtain the symbol information sequence compensated by the current instant to cause the transmitting side to transmit signals according to the compensated symbol information sequence.

In the embodiments of the present invention, the compensating for the nonlinearity of the transmitter may comprises: acquiring a symbol information sequence of the pulse signal input by a transmitting side; calculating the weighted sum of the interactions of the pulses on several different instants of several items relative to the current instant, to obtain the perturbation quantity produced by the current instant nonlinear effect on a transmission link of a certain length; and compensating the acquired symbol information sequence of the pulses at the current instant by using the obtained perturbation quantity, to obtain the symbol information sequence after being compensated at the current instant and cause the transmitting side to transmit signals according to the compensated symbol information sequence.

According to another aspect of the embodiments of the present invention, there is provided a transmitter, comprising:

an information sequence acquiring unit to acquire the symbol information sequence of an input pulse signal;

a nonlinear compensating unit to compensate the symbol information sequence of the pulses at the current instant acquired by the information sequence acquiring unit according to the weighted sum of the interactions of the pulses of several items on several different instants relative to the current instant, to obtain the compensated symbol information sequence; wherein the nonlinear compensating unit comprises the above nonlinear compensating apparatus;

a pulse shaping unit to perform pulses shape to the compensated symbol information sequence obtained by the nonlinear compensating unit, to obtain the waveform of each pulse; and a signal transmitting unit to receive the waveform of each pulse transmitted by the pulse shaping unit and transmit the waveforms after modulating.

In this embodiment, when the transmitter transmits signals, the following method may be adopted: acquiring a symbol information sequence of an input pulse signal; compensating the acquired symbol information sequence of the pulse at the current instant according to the weighted sum of the interactions of the pulses at several various instants relative to the current instant, to obtain the compensated symbol information sequence, wherein the above nonlinear compensation method may be adopted in compensating; perform pulses shaping to the obtained symbol information sequence after being compensated, to obtain the waveform of each pulse; and transmitting after the waveform is modulate.

The advantages of the embodiments of the present invention exist in that the nonlinear compensating apparatus uses the perturbation item obtained by the weighted sum of the interactions of the pulses at different instants relative to the current instant to correct the symbol information sequence of the input pulse signal of the transmitting side, so that when the nonlinear compensating apparatus is used in the transmitter, ideal undamaged signals may be obtained at the transmitter side by compensating the symbol information sequence obtained by the transmitter via the nonlinear compensating apparatus, which has low calculation complexity, may be applied in single-polarization and dual-polarization multiplex systems, and may be compatible with any modulation format.

The particular embodiments of the present invention will be disclosed in detail with reference to the following description and drawings, indicating the principle of the present invention and the manners that may be adopted. It should be understood that the present invention is not limited to the embodiments, while many modifications, alternations and equivalences may be made to the embodiments of the present invention within the scope of the spirits and terms of the appended claims.

The characteristics described and/or shown with respect to one embodiment may also be used in one or more other embodiments in the same or similar way, may be combined with the characteristics in other embodiments, or may be used to replace the characteristics in other embodiments.

It should be stressed that the term "comprise/include" used herein refers to the existence of a characteristic, a set, a step, or an assembly, but does exclude the existence or addition of one or more of another characteristic, set, step, or assembly.

DETAILED DESCRIPTION OF THE INVENTION

Various embodiments of the present invention will be described in the following with reference to the drawings. These embodiments are exemplary only and not limitative to the present invention. For the easy understanding of the principle and embodiments of the present invention by those skilled in the art, the embodiments of the present invention will be described taking an optical communication system as an example. However, it should be noted that the embodiments of the present invention are applicable to all the communication systems in which nonlinear damages exist.

Figure 1:
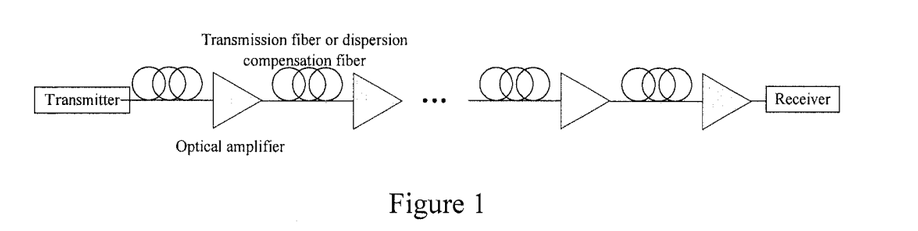
FIG. 1 is a schematic diagram of a typical optical communication system.

FIG. 1 is a schematic diagram of a typical optical communication system, in which the signals transmitted by a transmitter reach a receiver after passing through various devices (an optical fiber, an optical amplifier, and a dispersion compensating optical fiber, etc.) in a transmission link. In an embodiment of the present invention, the symbol information sequence of input pulse signals is compensated for at the transmitter side by a nonlinear compensating apparatus, so that the transmitting side transmits particularly deformed signals, and ideal undamaged signals may be obtained at the transmitter after these signals experienced a nonlinear effect of the fiber transmission.

In the system shown in FIG. 1, in order to compensate for the input pulse signals at the transmitting side, the applicant established first a nonlinear model in a channel in the process carrying out the present invention, and then compensated for the input pulse signals according to the nonlinear model.

In general cases, in order to improve the efficiency of the spectrum to a maximum extent, a polarization multiplexing is often utilized. Thus, the process for obtaining a nonlinear model in a channel will be described as follows taking dual polarization as an example.

Firstly, as to a vector signal, the transmission fiber may be modeled according to a Manakov equation, as shown in Equation A:

$$\frac{\partial}{\partial z} u_H(t,z) + \frac{\alpha(z)}{2} u_H(t,z) + j\frac{\beta_2(z)}{2}\frac{\partial^2}{\partial t^2} u_H(t,z) = \\ j\gamma(z)[|u_H(t,z)|^2 + |u_V(t,z)|^2] u_H(t,z)$$

$$\frac{\partial}{\partial z} u_V(t,z) + \frac{\alpha(z)}{2} u_V(t,z) + j\frac{\beta_2(z)}{2}\frac{\partial^2}{\partial t^2} u_V(t,z) = \\ j\gamma(z)[|u_V(t,z)|^2 + |u_H(t,z)|^2] u_V(t,z)$$

where, $u_H(t,z)$ and $u_V(t,z)$ are electrical field components of the signal at the horizontal and vertical polarization states, respectively; and $\alpha(z)$, $\beta_2(z)$ and $\gamma(z)$ represent the distribution of the attenuation coefficient, dispersion coefficient and nonlinear coefficient in the fiber link along the distance of transmission, respectively.

Secondly, since the signals generated by the transmitter are often composed of optical pulses, the electrical field components at the transmitter side may be expressed by Equation B:

$$u_H(t, z=0) = \sum_k A_k^H g(t-kT)$$
$$u_V(t, z=0) = \sum_k A_k^V g(t-kT)$$

where, $A_k^H$ and $A_k^V$ are information symbols of the kth pulse at the horizontal and vertical polarization states, respectively; T is the pulse interval; and g(t) is the waveform of each of the pulses.

Finally, the signals B are taken into Equation A, and in a case where the incident power is not relative large (i.e. the nonlinearity of the fiber link is not very intensive), the Equation A may be solved with the theory of perturbation, and Equation C is obtained:

$$u_H(t=kT, z=L) = u_H(t=kT, 0) + \\ \sum_{m,n} \{[A_{m+k}^H A_{n+k}^H (A_{m+n+k}^H)^* + A_{m+k}^H A_{n+k}^V (A_{m+n+k}^V)^*] C(m,n,z=L)\}$$

$$u_V(t=kT, z=L) = u_V(t=kT, 0) + \\ \sum \{[A_{m+k}^V A_{n+k}^V (A_{m+n+k}^V)^* + A_{m+k}^V A_{n+k}^H (A_{m+n+k}^H)^*] C(m,n,z=L)\}$$

Wherein in Equation C, the electrical field value at the kth pulse sampling instant at the receiver side is composed of the electrical field value and the perturbation quantity of the kth pulse at the transmitting end, wherein the perturbation quantity is a weighted sum of a plurality of interactive items, with each of the items being a product of transmitting pulse information symbols at different instants. Wherein during the process for solving the Equation A with the theory of perturbation, the calculation is performed taking the lower order items and regardless of the higher order items. Thus, in Equation C, only the weighted sum of the pulse interaction at three different instants, the (m+k)th, the (n+k)th and the (m+n+k)th, relative to the kth pulse sampling instant needs to be calculated. However, if the higher order items are taken into consideration in the process of calculation, the weighted sum of the pulse interaction at more than three different instants relative to the kth pulse sampling instant needs to be calculated. Following description is provided taken the weighted sum of the pulse interaction at three different instants as an example. The cases where there are more than three pulses are similar to the case where there are three pulses.

It can be seen from Equation C that the perturbation item in the current polarization state originates from two parts, one part originating from the intrinsic polarization state, and the other part originating from the orthogonal polarization state. For example, for a horizontal polarization state, the originating from the intrinsic polarization state is: $A_{m+k}^H A_{n+k}^H (A_{m+n+k}^H)^*$, and the part originating from the orthogonal polarization state is $A_{m+k}^H A_{n+k}^V (A_{m+n+k}^V)^*$. The case for a vertical polarization state is similar to this, and shall not be described any further.

Since in the Manakov Equation A, the symbol information in the two polarization states appear symmetrically, the symmetry finally results in that the coefficients of the perturbation items at the horizontal and vertical polarization states are identical. These coefficients are only related to the configuration of the link and the position (m, n) of interactive pulse with respect to that of the pulse at the current instant.

Based on the above nonlinear model, the basic idea of the pre-compensating method of an embodiment of the present invention is to transmit particularly deformed signals at the transmitting side, and to obtain ideal undamaged signals at the receiving side after these signals experienced a nonlinear effect of the fiber transmission. Wherein, it is assumed that the linear damage of the channel has been compensated in another way.

The nonlinear compensating apparatus and transmitter of the embodiments of the present invention will be described in detail in the following taking the optical communication system shown in FIG. 1 and the nonlinear model based on the communication system as an example.

Figure 2:
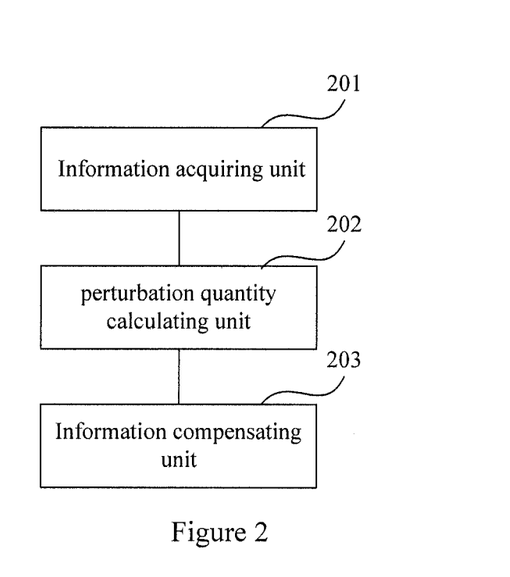
FIG. 2 is a schematic diagram of the structure of the nonlinear compensating apparatus in accordance with the 1st embodiment the present invention.

FIG. 2 is a schematic diagram of the structure of the nonlinear compensating apparatus of embodiment 1 of the present invention. As shown in FIG. 2, the apparatus comprises an information acquiring unit 201, a perturbation quantity calculating unit 202 and an information compensating unit 203; wherein the information acquiring unit 201 is used to acquire a symbol information sequence of the pulse information input at a transmitting side;

the perturbation quantity calculating unit 202 is used to calculate the weighted sum of the interactions of the pulses on several different instants of several items relative to the current instant, to obtain the perturbation quantity produced by the current instant nonlinear effect on a transmission link of a certain length; and the information compensating unit 203 is used to compensate for the symbol information sequence of the pulse at the current instant acquired by the information acquiring unit 201 by using the perturbation quantity acquired by the perturbation quantity calculating unit 202, to obtain the compensated symbol information sequence at the current instant, so that the transmitting side transmits signals according to the compensated symbol information sequence.

For example, as shown in FIG. 2, the information acquiring unit, the perturbation quantity calculating unit, and the information compensating unit are realized by Digital Signal Processor (DSP), Field Programmable Gate Array (FPGA), or Large Scale Interation (LSI).

It can be seen from the above embodiment that the apparatus can compensate for the symbol information of the pulse signals input at the transmitting side, if the apparatus is applied to a transmitter, the transmitter can perform pulse shaping and modulating to the compensated symbol information and finally transmit the signals, and ideal undamaged signals may be obtained at the transmitter after these signals experienced a nonlinear effect of the fiber transmission link. The apparatus compensates for the original information sequence by calculating the weighted sum of the pulse interaction at several different instants, with the method of calculating being simple for applying to single-polarization and dual-polarization multiplexing systems, and compatible with any modulation format.

Figure 3:
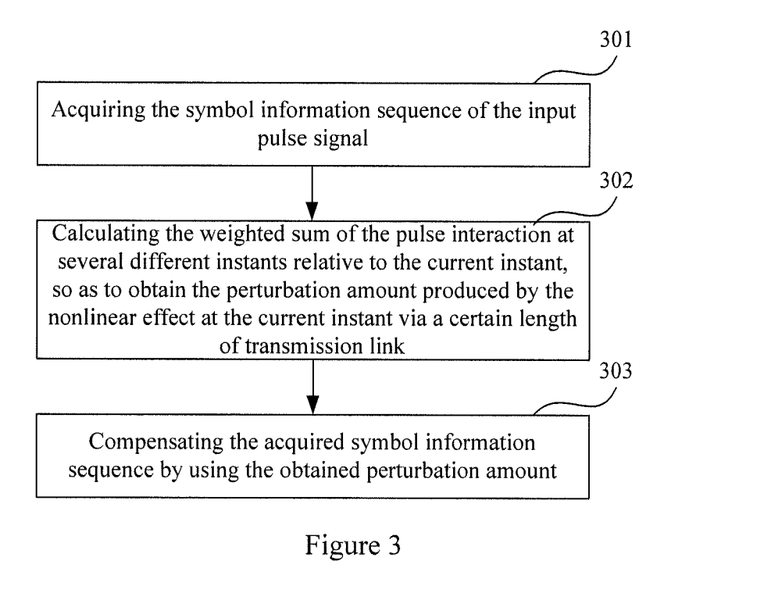
FIG. 3 is a flowchart of the nonlinear compensation method in accordance with the 1st embodiment of the present invention.

In this embodiment, in case of compensating for the symbol information of the pulse at the transmitting side by using this apparatus, the flow shown in FIG. 3 may be used. As shown in FIG. 3, the process comprises:

step 301: acquiring by the information acquiring unit 201 the symbol information sequence of the pulse signals input at the transmitting side;

step 302: calculating by the perturbation quantity calculating unit 202 the weighted sum of pulse interaction at several different instants relative to the current instant to obtain the perturbation quantity produced by the nonlinear effect at the current instant after a certain length of transmission link;

step 303: compensating for by the information compensating unit 203 the symbol information sequence of the pulse at the current instant acquired by the information acquiring unit 201 by using the perturbation quantity acquired by the perturbation quantity calculating unit 202, to obtain the compensated symbol information sequence at the current instant, so that the transmitting side transmits signals according to the compensated symbol information sequence.

In this embodiment, the symbol information sequence acquired by the information acquiring unit 201 is the symbol information before compensation, wherein the symbol information is related to the modulation format adopted, and the symbol information is different for different modulation formats. For example, for an OOK modulation, the symbol information sequence is 0,1; for an BPSK modulation, the symbol information sequence is −1,1; and for an QPSK modulation, the symbol information sequence is 1, j, −1, −j.

In this embodiment, the perturbation quantity calculating unit 202 is particularly applicable to calculate the weighed sum of the pulse interaction of at least three different instants relative to the current instant.

In this embodiment, the information compensating unit 203 is particularly applicable to obtain the compensated symbol information at the current instant, by subtracting the perturbation quantity acquired by the perturbation quantity calculating unit 202 from the symbol information sequence acquired by the information acquiring unit 201.

Figure 4:
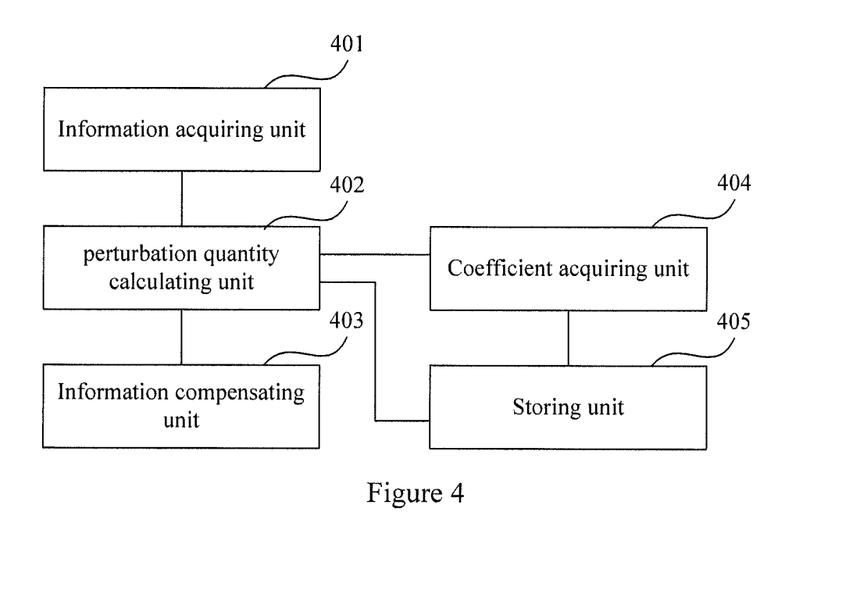
FIG. 4 is a schematic diagram of the structure of the nonlinear compensating apparatus in accordance with the 2nd embodiment the present invention.

FIG. 4 is a schematic diagram of the structure of the nonlinear compensating apparatus of embodiment 2 of the present invention. As shown in FIG. 4, the apparatus comprises an information acquiring unit 401, a perturbation quantity calculating unit 402 and an information compensating unit 403, with the functions of them being similar to those of the units in embodiment 1, which shall not be described any further.

In this embodiment, the perturbation quantity calculating unit 402 may use the following components to calculate the perturbation quantity.

Figure 5:
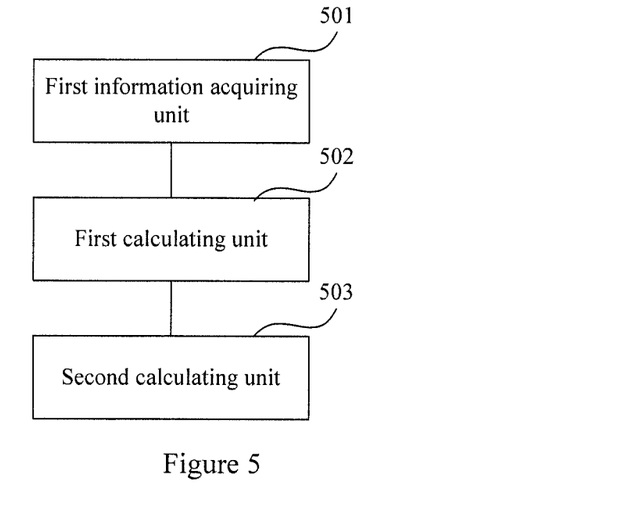
FIG. 5 is a schematic diagram of the structure of the perturbation quantity calculating unit in the nonlinear compensating apparatus in accordance with the 2nd embodiment of the present invention.

FIG. 5 is a schematic diagram of the structure of the perturbation quantity calculating unit 402 of embodiment 2 of the present invention. As shown in FIG. 5, the perturbation quantity calculating unit 402 comprises a first information acquiring unit 501, a first calculating unit 502 and a second calculating unit 503;

wherein the first information acquiring unit 501 is used to acquire the symbol information of the pulse of each of the several items at several different instants relative to the current instant;

the first calculating unit 502 is used to calculate the weighted sum of the pulse interaction of each of the items at several different instants relative to the current instant by using the symbol information of the pulse of each of the items at several different instants relative to the current instant and the weighted coefficient corresponding to each of the items obtained in advance, and to calculate the sum of the weighted values of the several items according to the weighted value of each of the items; and the second calculating unit 503 is used to calculate the product of the sum of the weighted values obtained by the first calculating unit 502 and a first predetermined value, to obtain the perturbation quantity produced by the nonlinear effect at the current instant on a certain length of transmission link;

wherein the first predetermined value is related to the signal power and the nonlinear coefficient of the transmission link.

Following description is provided taking the calculation of the weighted sum of the pulse interaction at three different instants, the (m+k)th, the (n+k)th and the (m+n+k)th, relative to the kth pulse sampling instant as an example; wherein the number of the items for the calculation of the weighted sum of the pulse interaction of several items at three different instants relative to the current instant is determined by the predetermined value of (m, n).

Thus, the perturbation quantity calculating unit 202 is particularly applicable to calculate the weighed sum of the pulse interaction of three different instants, such as the (m+k)th, the (n+k)th and the (m+n+k)th, relative to the current instant, such as the kth instant, so as to obtain the perturbation quantity produced by the nonlinear effect at the current kth instant on a certain length of transmission link In the embodiment above, the weighted coefficient corresponding to each of the items may be obtained in advance for use by the first calculating unit 502 in the perturbation quantity calculating unit 402 in calculating the weighted values. Thus, as shown in FIG. 4, the apparatus further comprises a coefficient acquiring unit 404 to acquire the weighted coefficient corresponding to each of the items by simulation, or to acquire the weighted coefficient of each of the items through experiment, or to acquire the weighted coefficient of each of the items according to the configuration of the transmission link and the position of the interactive pulses at different instants relative that of the pulse at the current instant.

Wherein when the weighted coefficient is obtained based on the simulation and experiment, different transmitting signals may be designed during the simulation or the experiment, and the value of the weighted coefficient may be deduced according to the received signals, with the accuracy of such a method being high.

Wherein when the coefficient acquiring unit 404 acquires the weighted coefficient of each of the items according to the configuration of the transmission link and the position of the interactive pulses at different instants relative that of the pulse at the current instant, the following formula may be used by the coefficient acquiring unit 404 to calculate the weighted coefficient:

$$C(m, n, z = L) = j \int_0^L \frac{\gamma(z)p(z)}{\sqrt{1 + 2js(z)/\tau^2 + 3(s(z)/\tau^2)^2}} \exp \left\{ -\frac{3mn T^2}{\tau^2(1 + 3js(z)/\tau^2)} - \frac{(m-n)^2 T^2}{\tau^2[1 + 2js(z)/\tau^2 + 3(s(z)/\tau^2)^2]} \right\} dz \quad (1)$$

wherein if the current instant is kth instant, the three different instants relative to the current instant are (m+k)th, the (n+k)th and the (m+n+k)th instants;

the (m, n) values of the several items are predetermined, with each (m, n) value corresponding to different weighted coefficient C(m, n, z=L);

wherein the values of m and n may comprise random values from negative infinity to positive infinity, relevant to the values at the instants before and after the current kth instant;

in addition, as (m, n) value increases, the corresponding C(m, n, z=L) will generally decrease and thus, it is possible to calculate the perturbation quantity based on a certain amount of the (m, n) values according to the required accuracy of calculation. In this case, the values of m and n may also be obtained in the following way: given m and n, and when the modulus |C(m,n,z=L)| of the weighted coefficient C(m, n, z=L) obtained according to m and n is greater than or equal to a second predetermined value, m and n may be taken, otherwise, m and n are not taken; the second predetermined value may be determined according to a certain proportional coefficient of the maximal modulus of all the coefficients, for example, a normalized coefficient C may take all the combinations of m and n satisfying |C(m,n,z=L)|>1e-3*max(|C(m,n,z=L)|);

where, p(z) represents the signal power way from the transmitting side with z on the transmission link, s(z) represents the accumulated net dispersion value away from the transmitting side with z on the transmission link, τ represents the half-value width of the pulse, T represents the pulse interval, and γ(z) represents the nonlinear coefficient away from the transmitting side with z on the transmission link;

Or, when no dispersion compensating module is included in the transmission link, the attenuation during the signal transmission is neglected at the same time, and the dispersion coefficient and the nonlinear coefficient do not vary along with the transmission distance, the coefficient acquiring unit 404 may also calculate the weighted coefficient by using the following formula:

$$C(m, n, z = L) = j \frac{\gamma p_0 \tau^2}{\sqrt{3} |\beta_2|} \exp \operatorname{int}\left(-j \frac{mn T^2}{\beta_2 L}\right) \quad (2)$$

where, γ represents the nonlinear coefficient, $p_0$ represents the signal power at the transmitting side, $\beta_2$ represents the dispersion coefficient, and exp int represents the exponential integral function, which may be expressed as $$\operatorname{expint}(z) = \int_z^\infty \frac{e^{-x}}{x} dx.$$

In addition, as shown in FIG. 4, the apparatus may further comprise a storing unit 405 to store the obtained weighted coefficients which is used by the first calculating unit 502 in the perturbation quantity calculating unit 402 to calculate the weighted values; furthermore, the storing unit 405 may also store the channel parameters for calculating the weighted coefficients, such as the nonlinear coefficient γ, the dispersion coefficient $\beta_2$, and the length of the transmission link L and the like.

For example, as shown in FIG. 4, the information acquiring unit, the perturbation quantity calculating unit, the information compensating unit, the coefficient acquiring unit, and the storing unit are realized by Digital Signal Processor (DSP), Field Programmable Gate Array (FPGA), or Large Scale Interation (LSI).

For example, as shown in FIG. 5, the first information acquiring unit, the first calculating unit and the second calculating unit are realized by Digital Signal Processor (DSP), Field Programmable Gate Array (FPGA), or Large Scale Interation (LSI).

Figure 6:
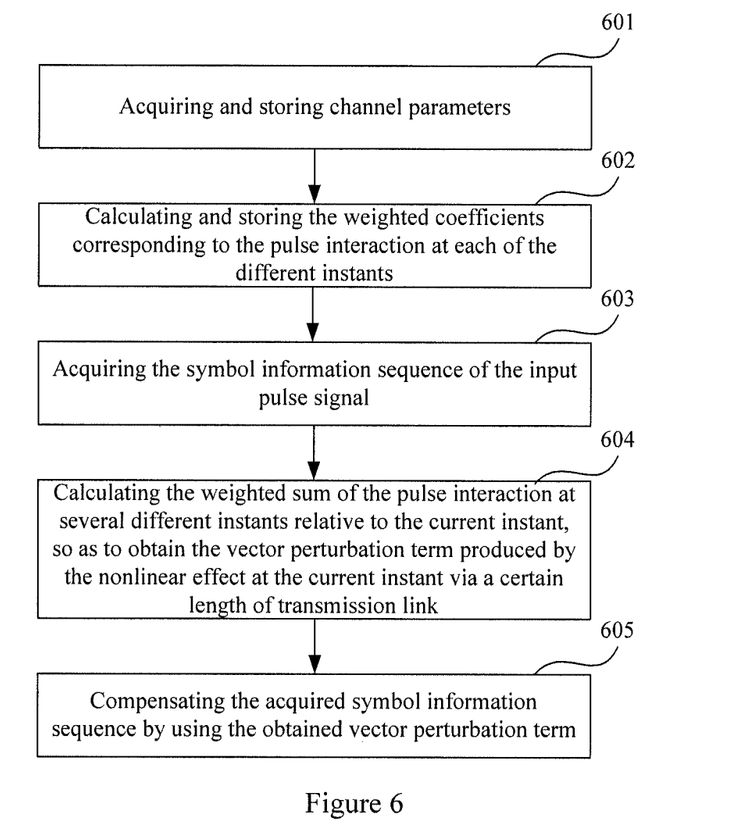
FIG. 6 is a flowchart of the nonlinear compensating apparatus in performing the nonlinear compensation in accordance with the 2nd embodiment of the present invention.

In the embodiment above, FIG. 6 is a flowchart of the nonlinear compensating apparatus in performing nonlinear compensation of embodiment 2 of the present invention. As shown in FIG. 6, it comprises the following steps:

step 601: acquiring in advance channel parameters, such as the nonlinear coefficient γ, the dispersion coefficient $\beta_2$, and the length of the transmission link L, which may be stored;

step 602: obtaining the weighted coefficient corresponding to the pulse interaction of each of the items at different instants by simulation or experiment or the above formula (1) or (2), with the weighted coefficient may be stored;

step 603: calculating the weighted value of each of the items by using the symbol information and weighted coefficient of the pulses at three different instants relative to the current instant, and adding up the weighted values of each of items; and then multiplying the sum of the weighted values by the first predetermined value to obtain the perturbation quantity produced by the nonlinear effect at the current instant on a certain length of transmission link; and step 604: compensating for the original information sequence by using the perturbation quantity to obtain the compensated symbol information sequence at the current instant, so that the transmitting side transmits signals according to the compensated symbol information sequence.

It can be seen from the above embodiment that the nonlinear compensating apparatus compensates for the symbol information of the input pulse signals of the transmitting side, and if the apparatus is applied to a transmitter, the transmitter may perform pulse shaping and modulating to the compensated symbol information and then transmit the signals, with ideal undamaged signals being obtained at the transmitter after these signals experienced a nonlinear effect of the fiber transmission; the apparatus compensates for the original information sequence by calculating the weighted sum of the pulse interaction at several different instants, with the method of calculating being simple for applying to single-polarization and dual-polarization multiplexing systems, and compatible with any format of modulation.

In the embodiment above, the compensating apparatus is applicable to single-polarization and dual-polarization signals, and following description is provided taking single polarization and dual polarization, the kth current instant and three different instants, the (m+k)th, the (n+k)th and the (m+n+k)th, as examples.

Wherein the (m, n) values of several items may be taken in advance, different (m, n) values of each of the items corresponding to different weighted coefficients C(m,n,z=L);

Wherein the values of m and n may comprise random values from negative infinity to positive infinity, relevant to the values at the instants before and after the current kth instant; in addition, the values of m and n may also be obtained in the following way: given m and n, and when the modulus of the weighted coefficient C(m, n, z=L) obtained according to m and n is greater than or equal to a second predetermined value, m and n may be taken, otherwise, m and n are not taken, for example, m and n when the normalized |C(m,n,z=L)|≥0.01;

furthermore, the weighted coefficient C(m, n, z=L) corresponding to different (m, n) values of each of the items may be obtained in advance by simulation or experiment, or obtained according to the configuration of the transmission link and the relative position of the interactive pulses, with the detailed methods being similar to what is described above, which will not be described any further.

EXAMPLE 1

For Single-polarization Signals when the input signals are single-polarization signals, the first information acquiring unit 501 may acquire the symbol information, such as, $A_{m+k}$, $A_{n+k}$ and $A_{m+n+k}$ of the respective pulse, according to different (m, n) values of each of the items;

the first calculating unit 502 may calculate the sum of the weighted values of pulse interaction of several items at different instants by using the following formula:

$$\Delta 1 = \sum_{m,n} \{(A_{m+k} A_{n+k} (A_{m+n+k})^*) \times C(m, n, z = L)\} \quad (3)$$

where, $(A_{m+k}A_{n+k}(A_{m+n+k})^*) \times C(m, n, z=L)$ is the weighted value of each of the items, $\Delta_1$ represents the sum of the weighted values of several items at the kth instant; C(m, n, z=L) represents the weighted coefficient of each of the items, z=L represents the length of the transmission link L, $A_{m+k}$ and $A_{n+k}$ represent the symbol information of the pulses at the (m+k)th and (n+k)th instants, respectively, and $(A_{m+n+k})^*$ represents the conjugation of the symbol information of the pulses at the (m+n+k)th instant;

the second calculating unit 503 uses the following formula to acquire the perturbation quantity produced by the current instant nonlinear effect on a transmission link of a certain length:

$$\Delta_k = \xi 1 \times \Delta 1 \quad (4)$$

where, $\Delta_k$ represents the perturbation quantity at the kth instant, and $\xi 1$ represents the first predetermined value, in this embodiment, the first predetermined value being the product of the signal power and the nonlinear coefficient γ of the link.

After the perturbation quantity calculating unit 402 acquired the perturbation quantity, the information compensating unit 403 may use the following formula to acquire the symbol information sequence compensated by the current instant:

$$B_k = A_k - \Delta_k \quad (5)$$

where, $B_k$ represents the compensated symbol information sequence of the pulses at the kth instant, and $A_k$ represents the symbol information sequence of the pulses at the kth instant.

It can be seen from above that since the symbol information of the pulses at different instants are related to the modulation formats, so, when the first calculating unit 502 calculates the product of the symbol information of each of several items, for example, when calculates $(A_{m+k}A_{n+k}(A_{m+n+k})^*)$, the multiplication may be performed through logic operation and therefore, the number of the times of multiplication is the number of the interactive items. The case for a dual-polarization state is similar to this.

Furthermore, if the modulation format of the system is phase modulation, such as BPSK and QPSK, since the symbol information sequence of the BPSK modulation is −1, 1, whereas that of the QPSK modulation is 1, j, −1, −j, the multiplication of the symbol information and the weighted coefficient, such as $(A_{m+k}A_{n+k}(A_{m+n+k})^*) \times C(m,n,z=L)$, may also be obtained through logic operation. Thus, the calculation of the interaction between the pulses at three different instants relative to the current instant may be carried out through addition, with no need of any operation of multiplication. Therefore, the present nonlinear compensating apparatus may greatly simplify the calculation, and is applicable to any modulation format.

EXAMPLE 2

For Dual-polarization Signals

When the input pulse signals are dual-polarization signals, the weighted value of each of the items calculated by the first calculating unit 502 is related to the intrinsic and orthogonal polarization states.

the first information acquiring unit 501 acquires the symbol information of the respective pulses according to different (m, n) values of each of the items, which symbol information including the symbol information in horizontal and vertical polarization states, such as the symbol information $A_{m+k}^H$, $A_{n+k}^H$ and $A_{m+n+k}^H$ in the horizontal state, and the symbol information $A_{m+k}^V$, $A_{n+k}^V$ and $A_{m+n+k}^V$ in the vertical state;

the first calculating unit 502 uses the following formulae to calculate the sum of the weighted values of the pulse interaction of several items at different instants, wherein the sum of the weighted values includes the sums of the weighted values in the horizontal and vertical states:

$$\Delta^H = \sum_{m,n} \{[A_{m+k}^H A_{n+k}^H (A_{m+n+k}^H)^* + A_{m+k}^H A_{n+k}^V (A_{m+n+k}^V)^*] \times C(m, n, z = L)\} \quad (5)$$

$$\Delta^V = \sum_{m,n} \{[A_{m+k}^V A_{n+k}^V (A_{m+n+k}^V)^* + A_{m+k}^V A_{n+k}^H (A_{m+n+k}^H)^*] \times C(m, n, z = L)\} \quad (6)$$

wherein the weighted value of each of the items is related to both of the intrinsic and orthogonal polarization states;

where, $\Delta^H$ represents the sum of the weighted values of several items in the horizontal state at the kth instant, and $\Delta^V$ represents the sum of the weighted values of several items in the vertical state at the kth instant;

$\{[A_{m+k}^H A_{n+k}^H (A_{m+n+k}^H)^* + A_{m+k}^H A_{n+k}^V (A_{m+n+k}^V)^*] \times C(m, n, z=L)\}$ is the weighted value of each of the items at the horizontal state, and $\{[A_{m+k}^V A_{n+k}^V (A_{m+n+k}^V)^* + A_{m+k}^V A_{n+k}^H (A_{m+n+k}^H)^*] \times C(m, n, z=L)\}$ is the weighted value of each of the items at the vertical state;

C(m, n, z=L) represents the weighted coefficient of each of the items, and z=L represents the length L of the transmission link;

$A_{m+k}^H$ and $A_{m+k}^V$ represent the symbol information at the (m+k)th instant in the horizontal polarization state and the vertical polarization state, respectively;

$A_{n+k}^H$ and $A_{n+k}^V$ represent the symbol information at the (n+k)th instant in the horizontal polarization state and the vertical polarization state, respectively;

and $(A_{m+n+k}^H)^*$ and $(A_{m+n+k}^V)^*$ represent the conjugation of the symbol information at the (m+n+k)th instant in the horizontal polarization state and the vertical polarization state, respectively.

the second calculating unit 503 uses the following formulae to acquire the perturbation quantity produced by the nonlinear effect at current instant on a transmission link of a certain length, wherein the perturbation quantity includes the perturbation quantitys in the horizontal polarization state and the vertical polarization state:

$$\Delta_k^H = \xi 2 \times \Delta^H; \quad (7)$$

$$\Delta_k^V = \xi 2 \times \Delta^V; \quad (8)$$

where, $\Delta_k^H$ and $\Delta_k^V$ represent the perturbation quantity at the kth instant in the horizontal polarization state and the vertical polarization state, respectively, $\Delta^H$ and $\Delta^V$ represent the sum of the weighted values of the several items at the kth instant in the horizontal polarization state and the vertical polarization state, respectively, and $\xi 2$ represents the first predetermined value.

After the perturbation quantity calculating unit 402 acquired the perturbation quantity, the information compensating unit 403 may use the following formulae to acquire the compensated symbol information sequence at the current instant:

$$B_k^H = A_k^H - \Delta_k^H; \quad (9)$$

$$B_k^V = A_k^V - \Delta_k^V; \quad (10)$$

where, $B_k^H$ and $B_k^V$ represent the compensated symbol information sequence of the pulses at the kth instant in the horizontal polarization state and the vertical polarization state, respectively, and $A_k^H$ and $A_k^V$ represent the symbol information sequence of the pulses at the kth instant in the horizontal polarization state and the vertical polarization state, respectively.

It can be seen from the above that the multiplication between the symbol information of each of the items calculated by the first calculating unit 502 may be performed through logic operation, and what is different from the single polarization is that the weighted value is not only related to the intrinsic polarization state, but also to the orthogonal polarization state. If the modulation format of the system is phase modulation, such as BPSK and QPSK, since the symbol information sequence of the BPSK modulation is −1, 1, whereas that of the QPSK modulation is 1, j, −1, −j, the multiplication of the symbol information and the weighted coefficient, such as $\{[A_{m+k}^H A_{n+k}^H (A_{m+n+k}^H)^* + A_{m+k}^H A_{n+k}^V (A_{m+n+k}^V)^*] \times C(m, n, z=L)\}$, may also be obtained through logic operation. It can be seen from this that the calculation of the interaction between the pulses at three different instants relative to the current instant may be carried out through addition, with no need of any operation of multiplication. Therefore, the nonlinear compensating apparatus may greatly simplify the calculation, and is applicable to any format of modulation.

It can be seen from the above embodiment that the nonlinear compensating apparatus may compensate for the symbol information of the input pulse signals, and if the apparatus is applied to a transmitter, the transmitter may perform pulse shaping and modulating to the compensated symbol information and then transmit the signals, with ideal undamaged signals being obtained at the transmitter after these signals experienced a nonlinear effect of the fiber transmission; the apparatus compensates for the original information sequence by calculating the weighted sum of the pulse interaction at several different instants. It can be seen from the above embodiment that the perturbation quantity may be obtained through logic operation and no multiplication operation is needed, especially for QPSK and BPSK modulation. Therefore, the apparatus may simplify the method of calculation, be applicable to single-polarization and dual-polarization multiplexing systems, and at the same time, be compatible with any modulation format.

Figure 7:
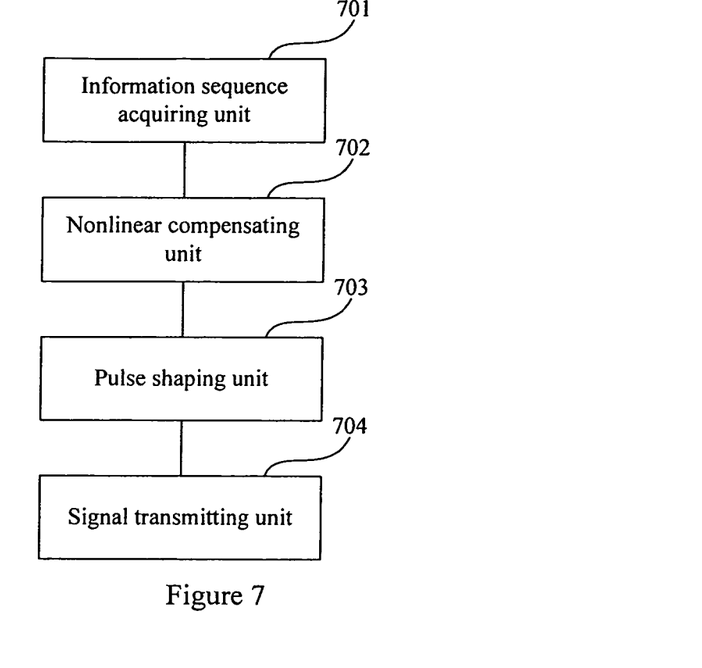
FIG. 7 is a schematic diagram of the structure of the transmitter in accordance with the 3rd embodiment of the present invention.

FIG. 7 is a schematic diagram of the structure of the transmitter of embodiment 3 of the present invention. As shown in FIG. 7, the transmitter comprises an information sequence acquiring unit 701, a nonlinear compensating unit 702, a pulse shaping unit 703 and a signal transmitting unit 704, wherein the nonlinear compensating unit 702 is disposed between the information sequence acquiring unit 701 and the pulse shaping unit 703 to compensate for the symbol information sequence of the input pulses acquired by the information sequence acquiring unit 701; wherein the nonlinear compensating unit 702 may use the above nonlinear compensating apparatus of embodiments 1 and 2, which shall not be described any further.

The functions of the information sequence acquiring unit 701, the pulse shaping unit 703 and the signal transmitting unit 704 are similar to those in the prior art, which shall be described in the following in brief.

The information sequence acquiring unit 701 is used to acquire the symbol information sequence of an input pulse signal;

the nonlinear compensating unit 702 is used to compensate for the symbol information sequence acquired by the information sequence acquiring unit 701 according to the weighted sum of the interaction of the pulses at several different instants relative to the current instant, to obtain the compensated symbol information sequence;

the pulse shaping unit 703 is used to perform pulses shaping to the compensated symbol information sequence obtained by the nonlinear compensating unit 702, to obtain the waveform of each pulse; and the signal transmitting unit 704 is used to receive the waveform of each pulse transmitted by the pulse shaping unit 703, then transmit the waveforms after modulating.

In the above embodiment, the nonlinear compensating apparatus is applied to the transmitter, and the transmitter is applicable to any optical communication system, in which an electrical field dispersion pre-compensated system is included.

Thus, the transmitter may also comprise the dispersion compensating unit (not shown). In a system comprising dispersion compensation, the nonlinear pre-compensating unit in the channel may be disposed before the dispersion pre-compensating unit. The weighted coefficients corresponding to the weighted values of the interaction of the pulses at different instants may still be calculated using the above formulae (1) and (2), with dispersion pre-compensating modules needing only to be considered in dispersion configuration.

For example, as shown in FIG. 7, the information sequence acquiring unit, the nonlinear compensating unit, the pulse shaping unit and the signal transmitting unit are realized by Digital Signal Processor (DSP), Field Programmable Gate Array (FPGA), or Large Scale Interation (LSI).

It can be seen from the above embodiment that when a transmitter transmits signals, following steps may be included: acquiring the symbol information sequence of the input pulse signals; compensating for the acquired symbol information sequence according to the weighted sum of the pulse interaction at several different instants relative to the current instant, to obtain compensated symbol information sequence, wherein the methods of nonlinear compensation of embodiments 1 and 2 are adopted; performing pulse shaping to the compensated symbol information sequence, so as to obtain the waveform of each pulse; and transmitting the waveforms being modulated. In addition, after the nonlinear compensation, dispersion pre-compensation may also be performed, which shall not be described any further.

Figure 8:
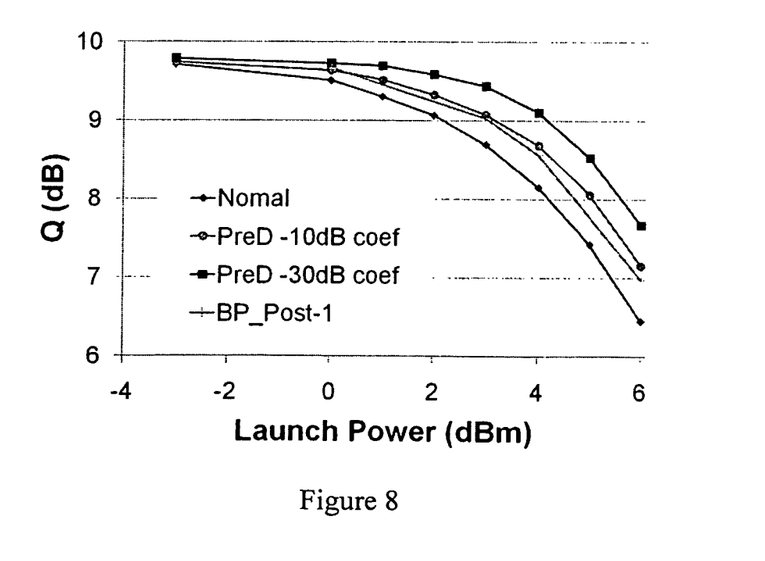
FIG. 8 is a performance comparison graph obtained in different nonlinear compensating schemes for QPSK modulation.

FIG. 8 is a graph showing the properties obtained in different nonlinear compensating schemes for QPSK modulation. The parameters adopted are listed in Table 1.

TABLE 1

List of parameters of the system

| Baud rate | 28 GB | Shape of pulse | RZ |
|---|---|---|---|
| Link | 80 km × 20 | Optical signal to noise ratio | 13.5 dB |
| Fiber dispersion coefficient | 17 ps/nm/km | Fiber attenuation coefficient | 0.2 dB/km |

TABLE 1-continued

List of parameters of the system

| Fiber nonlinear coefficient | 1.3 rad/W/km | Length of sequence | 8192 |
|---|---|---|---|

As shown in FIG. 8, performances improvement at different incident power for three different compensation methods is given. Wherein Normal is a performance graph of a method using no nonlinear compensation, BP_Post-1 is the method of pre-compensation using a reverse transmission, and PreD −10 db coef and PreD −10 db coef are the method of pre-compensation of an embodiment of the present invention.

Wherein BP_Post-1 uses a reverse transmission method for pre-compensating, in which calculation is performed once for a span, and which is different from the method of pre-compensation of an embodiment of the present invention in that the number of the interactive items are different.

In the pre-compensation method of the embodiment of the present invention, −10 dB represents that, after the items are normalized, all items 10 dB less than the maximal value are considered. Likewise, more items are considered for −30 dB.

Table 2 gives the performances and calculation complexity of three kinds of compensation methods. The performance same as that of the reverse transmission may be obtained when the coefficient −10 dB is considered for pre-compensation (the nonlinear tolerance is the maximal input power allowable by the system with reduction of performance of 1 dB), but the complexity is greatly simplified.

Higher input power is allowable in the method in which −30 dB is considered for pre-compensating, with the complexity being still less than that in the method of reverse transmission (the complexity of the system is mainly dependent on the operation of multiplication). Wherein, as shown in Table 2, the time for the operation of multiplication in the nonlinear compensating method of the present invention is zero and thus, the calculation is greatly simplified.

TABLE 2

|  | BP_Post-1 | −10 dB Coef. | −30 dB Coef. |
|---|---|---|---|
| Allowable value of power (dB) | 3.1 | 3.1 | 4.2 |
| Number of multiplication (each symbol) | 9240 | 0 | 0 |
| Number of addition (each symbol) | 6880 | 200 | 6248 |
| times for looking up table | 100 | 27 | 781 |

It can be seen from the above that the transmitter may compensate for the symbol information of the input pulse signals, perform pulse shaping and modulating to the compensated symbol information, and transmit the signals at last, with ideal undamaged signals being obtained at the receiver after these signals experienced the nonlinear effect of the fiber transmission link; the perturbation quantity may be obtained by the transmitter through logic operation and no multiplication operation is needed, especially for QPSK and BPSK modulation. Therefore, the apparatus may simplify the method of calculation, be applicable to single-polarization and dual-polarization multiplexing systems, and at the same time, be compatible with any format of modulation.

The above apparatus and method of the present invention may be carried out by hardware, and also by hardware in combination with software. The present invention relates to such a computer program that when the program is executed by a logic portion, it enables the logic portion to implement the apparatus as described above or the components thereof, or to implement the method as described above or the steps thereof. The present invention relates also to a storing medium, such a hard disc, a floppy disc, a compact disc, a DVD, or a flash memory, etc., to store the above program.

The present invention are described above in conjunction with the embodiments, however, it will be apparent to those skilled in the art that such description is exemplary only and is not limitative to the protection scope of the present invention. Various variations and modifications may be made by those skilled in the art without departing from the spirits and principle of the present invention, which will fall within the protection scope of the present invention.

As to the embodiments 1 3—containing the above examples, the following supplements are also disclosed.

(Supplement 1) A nonlinear compensating apparatus, comprising:

an information acquiring unit to acquire a symbol information sequence of the pulse signal input by a transmitting side;

a perturbation quantity calculating unit to calculate the weighted sum of the interaction of the pulses of several items at several different instants relative to the current instant, to obtain the perturbation quantity produced by the nonlinear effect at current instant on a transmission link of a certain length;

an information compensating unit to calculate the difference between the symbol information sequence at the current instant acquired by the information acquiring unit and the perturbation quantity obtained by the perturbation quantity calculating unit, so as to obtain the symbol information sequence compensated at the current instant to cause the transmitting side to transmit signals according to the compensated symbol information sequence.

(Supplement 2) The apparatus according to supplement 1, wherein the perturbation quantity calculating unit is particularly used to calculate the weighted sum of the interaction of the pulses on at least three different instants relative to the current instant.

(Supplement 3) The apparatus according to supplement 1, wherein the perturbation quantity calculating unit comprises:

a first information acquiring unit to acquire the symbol information of the pulses for each of the several items at several different instants relative to the current instant;

a first calculating unit to calculate the weighted value of interaction of the pulses in each item at several different instants relative to the current instant by using the symbol information of the pulses of each item at several different instants relative to the current instant and the pre-obtained weighted coefficient corresponding to each item, and to calculate the sum of the weighted values of the several items based on the weighted value of each item;

a second calculating unit to calculate the product of the sum of the weighted values obtained by the first calculating unit and a first predetermined value, to obtain the perturbation quantity produced by the nonlinear effect at current instant on a transmission link of a certain length, the first predetermined value being related to the signal power and the nonlinear coefficient of the transmission link.

(Supplement 4) The apparatus according to supplement 3, wherein when calculating the weighted sum of the interaction of the pulses at three different instants relative to the current instant and the input signal is a single-polarization signal, the first calculating unit adopts the following formula to calculate the sum of the weighted values of several items:

$$\Delta 1 = \sum_{m,n} \{(A_{m+k} A_{n+k} (A_{m+n+k})^*) \times C(m, n, z = L)\};$$

and the second calculating unit adopts the following formula to acquire the perturbation quantity produced by the nonlinear effect at current instant on a transmission link of a certain length:

$$\Delta_k = \xi \times \Delta 1;$$

where, $\Delta_k$ represents the perturbation quantity at the kth instant; $\Delta_1$ represents the sum of the weighted values of several items at the kth instant; and $\xi$ represents the first predetermined value;

$C(m, n, z=L)$ represents the weighted coefficient of each item; where, m and n are arbitrary values, or m and n are taken in the following way: taking m and n, such that the modulus of the weighted coefficient $C(m, n, z=L)$ obtained according to m and n is greater than a second predetermined value; and z=L represents the length L of the transmission link;

$A_{m+k}$ and $A_{n+k}$ represent the symbol information of the pulses at the (m+k)th instant and the (n+k)th instant, respectively.; and $(A_{m+n+k})^*$ represents the conjugation of the symbol information of the pulses at the (m+n+k)th instant.

(Supplement 5) The apparatus according to supplement 3, wherein when the input signal is a dual-polarization signal, the weighted value of each item calculated by the first calculating unit is related to the intrinsic polarization state and the orthogonal polarization state.

(Supplement 6) The apparatus according to supplement 5, wherein when calculating the weighted sum of the interaction of the pulses at three different instants relative to the current instant, the first calculating unit adopts the following formulae to calculate the sum of the weighted values of several items, wherein the sum of the weighted values of several items includes the sum of the weighted values in horizontal polarization state and the sum of the weighted values in vertical polarization state, and the formulae are:

$$\Delta^H = \sum_{m,n} \{[A_{m+k}^H A_{n+k}^H (A_{m+n+k}^H)^* + A_{m+k}^H A_{n+k}^V (A_{m+n+k}^V)^*] \times C(m, n, z = L)\};$$

$$\Delta^V = \sum_{m,n} \{[A_{m+k}^V A_{n+k}^V (A_{m+n+k}^V)^* + A_{m+k}^V A_{n+k}^H (A_{m+n+k}^H)^*] \times C(m, n, z = L)\};$$

and the second calculating unit adopts the following formulae to acquire the perturbation quantity produced by the nonlinear effect at current instant on a transmission link of a certain length, wherein the perturbation quantity includes perturbation quantity in horizontal polarization state and perturbation quantity in vertical polarization state, and the formulae are:

$$\Delta_k^H = \xi \times \Delta^H;$$

$$\Delta_k^V = \xi \times \Delta^V;$$

where, $\Delta_k^H$ and $\Delta_k^V$ represent the perturbation quantity at the kth instant in horizontal polarization state and the perturbation quantity in vertical polarization state, respectively; $\Delta^H$ and $\Delta^V$ represent the sum of the weighted values of several items at the kth instant in horizontal polarization state and in vertical polarization state, respectively; and $\xi$ represents the first predetermined value;

$C(m, n, z=L)$ represents the weighted coefficient of each item; where, m and n are arbitrary values, or m and n are taken in the following way: taking m and n, such that the modulus of the weighted coefficient C(m, n, z=L) obtained according to m and n is greater than or equal to a second predetermined value; and z=L represents the length L of the transmission link;

$A_{m+k}{}^H$ and $A_{m+k}{}^V$ represent the symbol information of the pulses at the (m+k)th instant in horizontal polarization state and in vertical polarization state, respectively; $A_{n+k}{}^H$ and $A_{n+k}{}^V$ represent the symbol information of the pulses at the (n+k)th instant in horizontal polarization state and in vertical polarization state, respectively; and $(A_{m+n+k}{}^H)^*$ and $(A_{m+n+k}{}^V)^*$ represent the conjugation of the symbol information of the pulses at the (m+n+k)th instant in horizontal polarization state and in vertical polarization state, respectively.

(Supplement 7) The apparatus according to supplement 4 or 6, wherein the apparatus further comprises:

a coefficient acquiring unit to acquire the weighted coefficient by simulation, or to acquire the weighted coefficient through experiment, or to acquire the weighted coefficient according to the configuration of the transmission link and the position of the interaction of the pulses at different instants relative to that of the pulses at the current instant.

(Supplement 8) The apparatus according to supplement 7, wherein when the coefficient acquiring unit acquires the weighted coefficient according to the configuration of the transmission link and the position of the interaction of the pulses at different instants relative to that of the pulses at the current instant, the coefficient acquiring unit adopts the following formula to calculate the weighted coefficient:

$$C(m, n, z = L) = j \int_0^L \frac{\gamma(z)p(z)}{\sqrt{1 + 2js(z)/\tau^2 + 3(s(z)/\tau^2)^2}} \exp \left\{ -\frac{3mnT^2}{\tau^2(1 + 3js(z)/\tau^2)} - \frac{(m-n)^2 T^2}{\tau^2[1 + 2js(z)/\tau^2 + 3(s(z)/\tau^2)^2]} \right\} dz$$

where, p(z) represents the signal power away from the transmitting side with z on the transmission link, s(z) represents the accumulated net dispersion values away from the transmitting side with z on the transmission link, τ represents the half-value width of the pulse, T represents the pulse interval, and γ(z) represents the nonlinear coefficient away from the transmitting side with z on the transmission link; or in the case where the attenuation in the link is neglected, no online dispersion compensating modulus exists in the link, and the dispersion coefficient and the nonlinear coefficient do not change along with the distance, the coefficient acquiring unit adopts the following formula to calculate the weighted coefficient:

$$C(m, n, z = L) = j \frac{\gamma p_0 \tau^2}{\sqrt{3}\,|\beta_2|} \mathrm{expint}\left(-j\frac{mnT^2}{\beta_2 L}\right)$$

where, γ represents the nonlinear coefficient; $p_0$ represents the signal power at the transmitting side; $\beta_2$ represents the dispersion coefficient; and exp int represents the exponent-integral function.

(Supplement 9) The apparatus according to supplement 3, wherein the symbol information of the pulse signals is related to the modulation format, and the first calculating unit adopts a logical operation in calculating the product of the symbol information of each item at several different instants relative to the current instant;

or, when the modulation format is phase modulation, the first calculating unit adopts a logical operation in calculating the product of the information symbol and the weighted coefficient;

or, when the modulation format is phase modulation, the interaction between the pulses at several different instants relative to the current instant are realized by adding.

(Supplement 10) A transmitter, comprising:

an information sequence acquiring unit to acquire the symbol information sequence of input pulse signals;

a nonlinear compensating unit to compensate for the symbol information sequence of the pulses at the current instant acquired by the information sequence acquiring unit based on the weighted sum of the interaction of the pulses of several items at several different instants relative to the current instant, to obtain the compensated symbol information sequence; wherein the nonlinear compensating unit comprises the nonlinear compensating apparatus in any one of supplements 1-9;

a pulse shaping unit to perform pulse shaping based on the compensated symbol information sequence obtained by the nonlinear compensating unit, to obtain the waveform of each pulse; and a signal transmitting unit to receive the waveform of each pulse transmitted by the pulse shaping unit and transmitting the waveforms after being modulated.

(Supplement 11) A nonlinear compensating method, comprising:

acquiring the symbol information sequence of the pulse signals input by a transmitting side;

calculating the weighted sum of the interaction of the pulses of several items at several different instants relative to the current instant, to obtain the perturbation quantity produced by the current instant nonlinear effect on a transmission link of a certain length; and calculating the difference between the acquired symbol information sequence and the obtained perturbation quantity, so as to obtain the symbol information sequence compensated at current instant to cause the transmitting side to transmit signals according to the compensated symbol information sequence.

(Supplement 12) The method according to supplement 11, wherein the calculating the weighted sum of the interaction of the pulses at several different instants relative to the current instant comprises: calculating the weighted sum of the interaction of the pulses on at least three different instants relative to the current instant.

(Supplement 13) The method according to supplement 12, wherein the calculating the weighted sum of the interaction of the pulses at several different instants relative to the current instant to obtain the perturbation quantity produced by the current instant nonlinear effect on a transmission link of a certain length comprises:

acquiring the symbol information of the pulses of each of the several items at several different instants relative to the current instant;

calculating the weighted value of the pulse interaction of each of the items at several different instants relative to the current instant by using the symbol information of the pulse of each of the items at several different instants relative to the current instant and the weighted coefficient corresponding to each of the items obtained in advance, and calculating the sum of the weighted values of the several items according to the weighted value of each of the items; and calculating the product of the sum of the weighted values and a first predetermined value, to obtain the perturbation quantity produced by the nonlinear effect at the current instant on a certain length of transmission link; wherein the first predetermined value is related to the signal power and the nonlinear coefficient of the transmission link.

(Supplement 14) The method according to supplement 13, wherein when the sum of the weighted values of the interaction of pulses of several items at different instants relative to the current instant is calculated and the input signal, is single-polarization signal, the following formula is used:

$$\Delta 1 = \sum_{m,n} \{(A_{m+k} A_{n+k} (A_{m+n+k})^*) \times C(m, n, z = L)\}$$

and the following formula is used in acquiring the perturbation quantity produced by the current instant nonlinear effect on a transmission link of a certain length:

$$\Delta_k = \xi 1 \times \Delta 1;$$

where, $\Delta_k$ represents the perturbation quantity at the kth instant, $\Delta_1$ represents the sum of the weighted values of several items at the kth instant, and $\xi 1$ represents the first predetermined value;

$C(m, n, z=L)$ represents the weighted coefficient of each of the items, wherein m and n are random values or the values of m and n are obtained in the following manner: take m and n, such that the modulus $|C(m, n, z=L)|$ of the weighted coefficient $C(m, n, z=L)$ obtained according to m and n is greater than or equal to a second predetermined value; and z=L represents the length L of the transmission link L; and $A_{m+k}$ and $A_{n+k}$ represent the symbol information of the pulses at the (m+k)th and (n+k)th instants, respectively, and $(A_{m+n+k})$ represents the conjugation of the symbol information of the pulses at the (m+n+k)th instant.

(Supplement 15) The method according to supplement 13, wherein the input signal is a dual-polarization signal, the calculated weighted value of each of the items is related to the intrinsic and orthogonal polarization states.

(Supplement 16) The method according to supplement 15, wherein the following formulae are used to calculate the sum of the weighted values of the pulse interaction of several items at different instants, wherein the sum of the weighted values of the several items includes the sums of the weighted values in the horizontal and vertical states:

$$\Delta^H = \sum_{m,n} \{[A^H_{m+k} A^H_{n+k} (A^H_{m+n+k})^* + A^H_{m+k} A^V_{n+k} (A^V_{m+n+k})^*] \times C(m, n, z = L)\};$$

$$\Delta^V = \sum_{m,n} \{[A^V_{m+k} A^V_{n+k} (A^V_{m+n+k})^* + A^V_{m+k} A^H_{n+k} (A^H_{m+n+k})^*] \times C(m, n, z = L)\};$$

and the following formulae are used to calculate the perturbation quantity produced by the current instant nonlinear effect on a transmission link of a certain length, wherein the perturbation quantity includes the sum of the perturbation quantitys in the horizontal and vertical states:

$$\Delta_k^H = \xi \times \Delta^H;$$

$$\Delta_k^V = \xi \times \Delta^V;$$

where, $\Delta_k^H$ and $\Delta_k^V$ represent the perturbation quantity at the kth instant in the horizontal polarization state and the vertical polarization state, respectively, $\Delta^H$ and $\Delta^V$ represent the sum of the weighted values of the several items at the kth instant in the horizontal polarization state and the vertical polarization state, respectively, and $\xi$ represents the first predetermined value;

$C(m, n, z=L)$ represents the weighted coefficient of each of the items, wherein m and n are random values or the values of m and n are obtained in the following manner: take m and n, such that the modulus of the weighted coefficient $C(m, n, z=L)$ obtained according to m and n is greater than or equal to a second predetermined value; and z=L represents the length L of the transmission link L; and $A_{m+k}^H$ and $A_{m+k}^V$ represent the symbol information of the pulses at the (m+k)th instant in the horizontal polarization state and the vertical polarization state, respectively, $A_{n+k}^H$ and $A_{n+k}^V$ represent the symbol information of the pulses at the (n+k)th instant in the horizontal polarization state and the vertical polarization state, respectively, and $(A_{m+n+k}^H)^*$ and $(A_{m+n+k}^V)^*$ represent the conjugation of the symbol information of the pulses at the (m+n+k)th instant in the horizontal polarization state and the vertical polarization state, respectively.

(Supplement 17) The method according to supplement 14 or 16, wherein the method further comprises:

the weighted coefficient is obtained by simulation or the weighted coefficient is obtained through experiment, or the weighted coefficient is obtained according to the configuration of the transmission link and the position of the interactive pulses relative to the position of the pulses at the current instant.

(Supplement 18) The method according to supplement 17, wherein when the weighted coefficient is acquired according to the configuration of the transmission link and the position of the interactive pulses at different instants relative that of the pulse at the current instant, the following formula may be used by the coefficient acquiring unit to calculate the weighted coefficient:

$$C(m, n, z = L) = j \int_0^L \frac{\gamma(z)p(z)}{\sqrt{1 + 2js(z)/\tau^2 + 3(s(z)/\tau^2)^2}} \exp\left\{-\frac{3mnT^2}{\tau^2(1 + 3js(z)/\tau^2)} - \frac{(m-n)^2 T^2}{\tau^2[1 + 2js(z)/\tau^2 + 3(s(z)/\tau^2)^2]}\right\} dz$$

where, p(z) represents the signal power away from the transmitting side with z on the transmission link, s(z) represents the accumulated net dispersion value away from the transmitting side with z on the transmission link, $\tau$ represents the half-value width of the pulse, T represents the pulse interval, and $\gamma(Z)$ represents the nonlinear coefficient away from the transmitting side with z on the transmission link;

or, when the attenuation in the link is neglected, no dispersion compensation module is included in the link, and the dispersion coefficient and the nonlinear coefficient do not vary along with the distance, the weighted coefficient may also be calculated by the coefficient acquiring unit by using the following formula:

$$C(m, n, z = L) = j \frac{\gamma p_0 \tau^2}{\sqrt{3}\,|\beta_2|} \text{expint}\left(-j\frac{mnT^2}{\beta_2 L}\right)$$

where, $\gamma$ represents the nonlinear coefficient, $p_0$ represents the signal power at the transmitting side, $\beta_2$ represents the dispersion coefficient, and exp int represents the exponent-integral function.

(Supplement 19) The method according to supplement 13, wherein the symbol information of the pulse signals is related to the modulation format, and the multiplication of the symbol information of each of the items at three different instants relative to the current instant performed by the first calculating unit is obtained through logic operation; or when the modulation format is phase modulation, the multiplication of the symbol information and the weighted coefficient performed by the first calculating unit is obtained through logic operation; or when the modulation format is phase modulation, the interaction of the pulses at several instants relative to the current instant is carried out through addition.

(Supplement 20) A method for transmitting signals, comprising:

acquiring the symbol information sequence of input pulse signals;

compensating for the symbol information sequence of the pulses at the current instant according to the weighted sum of the interaction of the pulses at several different instants relative to the current instant, to obtain the compensated symbol information sequence, wherein the nonlinear compensating apparatus comprises the nonlinear compensating method of any of the supplements 11-19;

performing pulse shaping to the obtained compensated symbol information sequence, to obtain the waveform of each pulse; and transmit the waveforms after modulating.

The invention claimed is:

1. A nonlinear compensating apparatus, comprising: an information acquiring unit configured to acquire a symbol information sequence of a pulse signal inputted by a transmitting side; a perturbation quantity calculating unit configured to calculate a weighted sum of interactions of pulses of several items at several different instants relative to a current instant to obtain the perturbation quantity produced by the nonlinear effect at the current instant on a transmission link with a certain length; an information compensating unit configured to calculate a difference between the symbol information sequence acquired by the information acquiring unit and the perturbation quantity obtained by the perturbation quantity calculating unit so as to obtain the symbol information sequence compensated at the current instant to cause the transmitting side to transmit signals according to the compensated symbol information sequence wherein the perturbation quantity calculating unit is further configured to acquire the symbol information of the pulses of each of the several items at several different instants relative to the current instant to calculate a weighted value of a pulse interaction of each of the items at several different instants relative to the current instant by using the symbol information of the pulse of each of the items at several different instants relative to the current instant and a weighted coefficient corresponding to each of the items obtained in advance and to calculate the sum of the weighted values of the several items according to the weighted value of each of the items, and further to calculate a product of the sum of the weighted values and a first predetermined value to obtain the perturbation quantity produced by the nonlinear effect at the current instant on the certain length of the transmission link; wherein the first predetermined value is related to a signal power and a nonlinear coefficient of the transmission link.

2. The apparatus according to claim 1, wherein the perturbation quantity calculating unit is used to calculate the weighted sum of the interactions of the pulses on at least three different instants relative to the current instant.

3. The apparatus according to claim 1, wherein the perturbation quantity calculating unit further comprises: a first information acquiring unit to acquire the symbol information of the pulses for each of the several items at several different instants relative to the current instant; a first calculating unit configured to calculate the interactions of the pulses in each item at several different instants relative to the current instant by using the symbol information of the pulses of each item at several different instants relative to the current instant and a pre-obtained weighting coefficient corresponding to each item and further configured to calculate the sum of the weighted values of the several items based on the weighted value of each item; a second calculating unit configured to calculate the product of the sum of the weighted values obtained by the first calculating unit and a first preset value to obtain the perturbation quantity produced by the nonlinear effect at current instant on a transmission link with certain length, wherein the first preset value is related to a signal power and a nonlinear coefficient of the transmission link.

4. The apparatus according to claim 3, wherein when calculating the weighted sum of the interactions of the pulses at least three different instants relative to the current instant and the input signal is a single-polarization signal, the first calculating unit uses the following formula to calculate the sum of the weighted values of several items:

$$\Delta 1 = \sum_{m,n} \{(A_{m+k} A_{n+k} (A_{m+n+k})^*) \times C(m, n, z = L)\};$$

and the second calculating unit uses the following formula to acquire the perturbation quantity produced by the nonlinear effect at current instant on a transmission link with certain length:

$$\Delta_k = \xi \times \Delta 1;$$

where $\Delta_k$ represents the perturbation quantity at the k th instant; $\Delta_1$ represents the sum of the weighted values of several items at the k th instant; and $\xi$ represents the first preset value; and where $C(m, n, z=L)$ represents the weighting coefficient of each item m and n are arbitrary values, or m and n are taken in the following way: taking m and n, such that the module of the weighting coefficient $C(m, n, z=L)$ obtained according to m and n is greater than a second preset value; and $Z=L$ represents the length of the transmission link; $A_{m+k}$ and $A_{n+k}$ represent the symbol information of the pulses at the (m+k) instant and the (n+k) instant, respectively; and $(A_{m+n+k})^*$ represents the conjugation of the symbol information of the pulses at the (m+n+k) instant.

5. The apparatus according to claim 3, wherein when the input signal is a dual-polarization signal, the weighted value of each item calculated by the first calculating unit is related to a polarization state of the input signal and a orthogonal polarization state of the input signal.

6. The apparatus according to claim 5, wherein when calculating the weighted sum of the interactions of the pulses at three different instants relative to the current instant, the first calculating unit uses the following formulae to calculate the sum of the weighted values of several items, wherein the sum of the weighted values of several items includes the sum of the weighted values in horizontal polarization state and the sum of the weighted values in vertical polarization state, and the formulae are:

$$\Delta^H = \sum_{m,n} \{[A^H_{m+k} A^H_{n+k} (A^H_{m+n+k})^* + A^H_{m+k} A^V_{n+k} (A^V_{m+n+k})^*] \times C(m, n, z = L)\};$$

-continued $$\Delta^V = \sum_{m,n} \{[A^V_{m+k} A^V_{n+k} (A^V_{m+n+k})^* + A^V_{m+k} A^H_{n+k} (A^H_{m+n+k})^*] \times C(m, n, z = L)\};$$

and the second calculating unit uses the following formulae to acquire the perturbation quantity produced by the nonlinear effect at current instant on the transmission link with the certain length, wherein the perturbation quantity includes perturbation quantity in horizontal polarization state and perturbation quantity in vertical polarization state and the formulae are:

$$\Delta_k^H = \xi \times \Delta^H;$$

$$\Delta_k^V = \xi \times \Delta^V;$$

where $\Delta_k^H$ and $\Delta_k^V$ represent the perturbation quantity at the k th instant in horizontal polarization state and the perturbation quantity in vertical polarization state, respectively; $\Delta^H$ and $\Delta^V$ represent the sum of the weighted values of several items at the k th instant in horizontal polarization state and in vertical polarization state, respectively; and $\xi$ represents the first preset value; and where C(m, n, z=L) represents the weighting coefficient of each item; where, m and n are arbitrary values, or m and n are taken in the following way: taking m and n, such that the module of the weighting coefficient C(m, n, z=L) obtained according to m and n is greater than or equal to a second preset value; and Z=L represents the length of the transmission link; $A_{m+k}^H$ and $A_{m+k}^V$ represent the symbol information of the pulses at the (m+k) instant in horizontal polarization state and in vertical polarization state, respectively; $A_{n+k}^H$ and $A_{n+k}^V$ represent the symbol information of the pulses at the (n+k) th instant in horizontal polarization state and in vertical polarization state, respectively; and $(A_{m+n+k}^H)^*$ and $(A_{m+n+k}^V)^*$ present the conjugation of the symbol information of the pulses at the (m+n+k) th instant in horizontal polarization state and in vertical polarization state, respectively.

7. The apparatus according to claim 4, wherein the apparatus further comprises: a coefficient acquiring unit configured to acquire the weighting coefficient in a simulation manner, configured to acquire the weighting coefficient in an experimental manner or configured to acquire the weighting coefficient according to the transmission link and the relative position of the interactions of the pulses at different instants relative to that of the pulses at the current instant.

8. The apparatus according to claim 7, wherein when the coefficient acquiring unit acquires the weighting coefficient according to the transmission link and the relative position of the interactions of the pulses at different instants relative to that of the pulses at the current instant, the coefficient acquiring unit uses the following formula to calculate the weighting coefficient:

$$C(m, n, z = L) = j \int_0^L \frac{\gamma(z) p(z)}{\sqrt{1 + 2js(z)/\tau^2 + 3(s(z)/\tau^2)^2}} \exp$$

$$\left\{ -\frac{3mnT^2}{\tau^2(1 + 3js(z)/\tau^2)} - \frac{(m-n)^2 T^2}{\tau^2[1 + 2js(z)/\tau^2 + 3(s(z)/\tau^2)^2]} \right\} dz$$

where p(z) represents the power of the signal on the transmission link apart from the transmitting side with z, s(z) represents the accumulated net dispersion value on the transmission link apart from the transmitting side with z, $\tau$ represents the half-value width of the pulse, T represents the pulse interval, and $\gamma(Z)$ represents the nonlinear coefficient on the transmission link apart from the transmitting side with z; or in the case where the attenuation in the link is neglected, no online dispersion compensating module exists in the link and the dispersion coefficient and the nonlinear coefficient do not change along with the distance, the coefficient acquiring unit uses the following formula to calculate the weighting coefficient:

$$C(m, n, z = L) = j \frac{\gamma p_0 \tau^2}{\sqrt{3} |\beta_2|} \text{expint}\left(-j \frac{mnT^2}{\beta_2 L}\right)$$

where $\gamma$ represents the nonlinear coefficient; $p_0$ represents the signal power at the transmitting side; $\beta_2$ represents the dispersion coefficient; and expint represents the exponent-integral function.

9. The apparatus according to claim 3, wherein the symbol information of the pulse signal is related to a modulation format and the first calculating unit uses a logical operation in calculating the product of the symbol information of each item at several different instants relative to the current instant; or, when the modulation format is a phase modulation format, the first calculating unit uses a logical operation in calculating the product of the information symbol and the weighting coefficient; or, when the modulation format is a phase modulation format, the interactions between the pulses at several different instants relative to the current instant are implemented in an adding manner.

10. A transmitter, comprising: an information sequence acquiring unit configured to acquire the symbol information sequence of input pulse signal; a nonlinear compensating unit configured to compensate the symbol information sequence of the pulses at the current instant acquired by the information sequence acquiring unit based on the weighted sum of the interactions of the pulses of several items at several different instants relative to the current instant to obtain the compensated symbol information sequence at the current instant, wherein the nonlinear compensating unit comprises the nonlinear compensating apparatus of claim 1 and further includes: a pulse shaping unit configured to perform pulses shaping based on the compensated symbol information sequence obtained by the nonlinear compensating unit to obtain a waveform of each pulse; a signal transmitting unit configured to receive the waveform of each pulse transmitted by the pulse shaping unit and configured to transmit the waveforms after being modulated.

* * * * *